Patented Oct. 26, 1943

2,332,849

UNITED STATES PATENT OFFICE 2,332,849

SOFTENING AGENT FOR HIGH POLYMERIC SUBSTANCES

Wolfgang Gruber and Hans Machemer, Burghausen, Germany; vested in the Alien Property Custodian No Drawing. Application March 10, 1941, Serial No. 382,665. In Germany March 15, 1940

8 Claims. (Cl. 260—36)

The esters of the fatty acids of cottonseed oil, linseed oil, olive oil, sesame oil or tall oil, of fish oil, coconut oil and the like, do not dissolve practically high polymeric vinyl chlorides or nitrocellulose in the heat and have only slight plastifying properties. If trying to produce artificial material of equal parts of polymeric vinyl chloride and oleic acid methyl ester, linseed oil acid ethyl ester or tall oil fatty acid methyl ester at 200–250°, fatty non-homogeneous products are formed in which the softener is uncombined. With a double quantity of polymeric vinyl chloride very hard, brittle, and sintered substances are obtained, breaking at 0° and sweating out the softener at room temperature. Therefore a practical working up of these nonsolvents with the mentioned polymeric substances is difficult.

Now it has been found that excellent softeners for high polymeric substances as polyvinyl chlorides, polyvinyl acetates, cellulose acetates, nitro celluloses, cellulose ethers and the like, may be obtained if the double bonds in the esters of the above mentioned fatty acids are removed wholly or partly and, according to the known method of work, hydroxyl groups or hydroxyl and chlorine or, if necessary, also chlorine alone is added and the groups led in are substituted, e. g. acylated and/or alkylated.

Such derivatives of the mentioned unsaturated fatty acids can be produced as follows:

Example 1

10 parts of oleic acid are oxidized with 3 parts of potassium hydroxide in 25 parts of water and 10 parts of potassium permanganate in 25 parts of water in the course of 24 hours at 0–10°. From the filtrate a solid acid is separated by acidifying which proves to be trans-9.10-dihydroxy stearic acid (melting-point 134°) after recrystallizing with alcohol. By esterifying this acid with methyl alcohol containing hydrogen chloride, there is obtained trans-dihydroxy stearic acid methyl ester (melting point 106°), and by boiling it with acetic acid anhydride in excess and sodium acetate as a catalyst trans-9.10-diacetoxy stearic acid methyl ester (boiling-point at 0.8 mm. 201°) is obtained.

Example 2

10 parts of oleic acid are oxidized in 40 parts of glacial acetic acid with 4 parts of 30% hydrogen peroxide for one hour under reflux, and after adding 10 parts of glacial acetic and 2 parts of 30% hydrogen peroxide it is oxidized further for one hour under boiling. The residue of evaporization yields after saponifying and acidifying cis-9.10-dihydroxy stearic acid (meltingpoint: 95–98°), which is esterified with methyl alcohol containing hydrogen chloride to cisdihyroxy stearic acid.methyl ester (meltingpoint: 72–74°) and is acetylated with acetic anhydride in excess and sodium acetate to cisdiacetoxy stearic acid methyl ester (boiling-point at 2 mm. 221°).

The corresponding butyl ester can be produced as the above mentioned methyl ester with the exception that the esterification is carried out with butyl alcohol containing hydrogen chloride. In the same way ethoxy butyl ester may be produced by esterifying with ethoxy butyl alcohol containing hydrogen chloride.

Example 3

100 parts of tall oil (boiling point at 3 mm. 185–230°) with the acid number of 162 and the iodine number of 180 according to Smit, 189 according to Hanus, are dissolved in 60 parts of potash lye in 5000 parts of water and oxidized under stirring with 200 parts of potassium permanganate/5000 parts of water at about 5° in the course of 24 hours. From the filtrate the acids soluble in water are separated by acidfying, and by recrystallization with alcohol a crystallized acid (melting point: 132°) with the acid number of 179 is obtained. The esterification with ethyl alcohol containing hydrogen chloride and the following acetylization with acetic anhydride and sodium acetate yield the acetyl derivative of a hydroxylized fatty acid ethyl ester (boiling point at 0.7 mm. 215°).

Example 4

100 parts of tall oil according to Example 3 are boiled in 800 parts of glacial acetic acid with 80 parts of 30% hydrogen peroxide for one hour in reflux and further oxidized after an addition of 200 parts of glacial acetic acid and 40 parts of 30% hydrogen peroxide for one hour. The residue of evaporization yields after saponifying with soda lye and acidifying a hydroxylized fatty acid insoluble in water with the iodine number of 43. It is esterified with methyl alcohol containing hydrogen chloride, and the residue of evaporation is acetylated with acetic anhydride in excess and sodium acetate for 2 hours under reflux. After separating the acetylated product and washing and drying an ester free from hydroxyl groups is obtained with the acid number of 16, esterification number of 230 and iodine number of 60.

Example 5

10 parts of oleic acid are dissolved under stirring in 5 parts of sodium carbonate/50 parts of water and treated at 0° with 2.7 parts of chlorine. The hydroxy chlorostearic acid, precipitated after acidifying, yields by esterification with methyl alcohol containing hydrogen chloride and after neutralizing a residue of evaporation with 12.6% of chlorine after being dried in vacuum. After boiling for four hours with acetic anhydride in excess and sodium acetate as a catalyst an acetylized acid ester of 11.3% of chlorine free from hydroxyl groups is obtained. Producing these esters, oleic acid methyl ester, being afterwards oxidized and acetylated as above described, may be used as starting material.

Example 6

10 parts of tall oil fatty acid methyl ester (boiling point at 1 mm. 180–185°) are stirred at 0° with the solution of 6.4 parts of sodium carbonate in 60 parts of water and treated with 4.5 parts of chlorine. The reaction product is washed and dried. An ester containing 20.3% of chlorine is obtained changing into an ester of 18.5% of chlorine by being treated for 2–3 hours with acetic anhydride in excess and sodium acetate.

Example 7

10 parts of oleic acid methyl ester (boiling point of 2 mm. 185–200°) are chlorinated in 10 parts of petroleum ether under stirring and cooling until chlorine can be identified in the waste gas. After neutralizing by washing in ice water and drying in vacuum at 150° a chlorinated derivative of the ester of 38.1% of chlorine is obtained.

If 6 parts of the chlorinated ester are boiled for some hours in 10 parts of methyl alcohol at 100° with 0.8 parts of sodium in 25 parts of methanol, hereafter washed and dried in vacuum, a substance of 8.6% of methoxyl and 22.8% of chlorine is formed.

Example 8

10 parts of tall oil fatty acid methyl ester (boiling point at 1 mm. 180–185°) are chlorinated in 10 parts of petroleum ether under stirring and cooling until the saturation of the C=C bonds. After neutralization by washing and drying an ester of 31.8% of chlorine is obtained.

The derivatives of unsaturated fatty acids of high molecular weight, produced according to the above described examples, are excellent softeners for high polymeric substances, especially for highest molecular polyvinyl chloride. The capacity of these esters for dissolving polyvinyl chloride is, in contrast to the unsubstituted saturated fatty acid esters, so strong that generally it is not necessary to add other softeners like tricresyl phosphate or phthalic acid esters. The mentioned esters give the polyvinyl chloride above all excellent cold stabilities. In this sense the esters of the diacetoxy stearic acids, according to the Examples 1 and 2, are especially suitable, above all the butyl and especially the ethoxy butyl esters according to Example 2. The esters last mentioned are also suitable to improve the somewhat imperfect cold stability of the only chlorinated esters which easily can be got according to Examples 7 and 8, so that they are satisfying in all respects. Not only the esters themselves and their mixtures are excellent softeners for polyvinyl chloride, but it has been proved that extraordinary good effects, specially according to the cold stability, can be obtained with mixtures containing intermediate products as components of mixture, which are obtained by producing the esters as described in the examples. Thus an artificial substance of 3 parts of polyvinyl chloride, 2 parts of diacetoxy stearic acid methyl ester and 1 part of tall oil fatty acid methyl ester has a cold stability of −60°. This material is not greasy and is extremely elastic. An addition of dihydroxy stearic acid to the esters described in the examples improves the smoothness of artificial material of polyvinyl chloride and facilitates spraying. Even considerable amounts of unsaturated or saturated fatty acid esters may be employed. An addition of chloronaphthalene improves the heat stability of these materials.

The pressed masses produced at 180–200° can be also easily welded, because in consequence of the high boiling point and the favorable properties of dissolving no carbonization of the softener occurs and the welded spots are often scarcely to be distinguished when the material is cut. In consequence of the great cold stability the products are especially suitable for those manufactures requiring elasticity and bending strength in the cold. The resistance to pressure, resistance to tearing, resistance to notch, and the resistance to abrasion is considerable. The halogen adheres much better to the chlorinated products than to the low molecular fatty acids.

In the examples oleic acid and tall oil fatty acids were always used as starting materials. All oils mentioned in the introduction, however, may also be applied as starting materials. Thus, e. g. the linseed oil acid may be oxidized by potassium permanganate in diluted alkaline solution to a tetrahydroxy fatty acid, the sativine acid, and this may be esterified and acidylated and/or alkylated. These derivatives are also excellent softeners for high polymeric substances.

As cold stability the temperature is named at which the pressed mass can still be bent. About 10° lower the product becomes brittle and breakable.

The application of the above described softeners in particular may be demonstrated by the following examples:

Example 9

100 parts of polymeric vinyl chloride are kneaded with 100 parts of trans-diacetoxy stearic acid methyl ester and then the mixture is worked up in the known way under employing pressure and heat to plates, rods, tubes, hose, threads and commodities which are very smooth and elastic and have the resistance to cold of −39° and the resistance to heat of 150 minutes/170°. The softener does not sweat out in the heat. The masses can be easily welded in the heat. An addition of dihydroxy stearic acid (10%) improves the resistance to cold up to −43°, improves the smoothness and facilitates the spraying.

Example 10

Waste leather, asbestos, cellulose, paper, pasteboard, cork, and the like are kneaded with a solution consisting of 10% of polymeric vinyl chloride and 8% of diacetoxy stearic acid methyl ester, after which the mass is worked out to packing materials.

*Example 11*

10 parts of polymeric vinyl chloride and 10 parts of trans-diacetoxy stearic acid methyl ester are dissolved in 100 parts of tetrahydrofurane; from this solution may be cast a film of high extensibility and of a resistance to cold of −80°. The solution is suitable for impregnating fabrics and after an addition of 3 parts of pigments it is suitable for producing artificial leather and for covering textile fabrics. Instead of applying methyl ester also butyl ester may be used.

*Example 12*

100 parts of polymeric vinyl chloride and 100 parts of acetoxy tall oil fatty acid ethyl ester are dissolved in 500 parts of tetrahydrofurane and 500 parts of methyl propyl ketone. The solution is suitable as a lacquer for cables and yields water-tight foils flexible at −35°.

*Example 13*

100 parts of polymeric vinyl chloride are mixed with 100 parts of cis-diacetoxy stearic acid-3-ethoxybutyl ester and the mass is sprayed to elastic plates, hoses, and the like which may easily be welded. They have a resistance to cold of −48°.

*Example 14*

100 parts of polymeric vinyl chloride and 100 parts of acetoxy chlorostearic acid methyl ester are dissolved in 800 parts of a low boiling solvent. The solution is suitable for covering metal, glass, paper, and fabrics. The lacquer has a resistance to cold of −39° after removing the volatile constituents.

*Example 15*

12 parts of polymeric vinyl chloride are kneaded with 4 parts of diacetoxy stearic acid butyl ester and 4 parts of acetoxy chlorostearic acid ethyl ester, after which the mass is sprayed to elastic and flexible commodities having the resistance to cold of −42°. They may easily be welded.

*Example 16*

9 parts of polymeric vinyl chloride are melted with 4 parts of chlorinated tall oil fatty acid methyl ester and 2 parts of diacetoxy stearic acid methyl ester, whereby an elastic mass is obtained, having the resistance to cold of −30° and which does not sweat out the softener.

*Example 17*

3 parts of polyvinyl chloride, 2 parts of diacetoxy stearic acid methyl ester and 1 part of tall oil fatty acid methyl ester are pressed to plates, tubes or foils and thereby products of the resistance to cold of −60° are obtained. After dilution in suitable solvents products are obtained suitable for the covering of electric conducting wires, cables, and the like.

*Example 18*

10 parts of acetyl cellulose are dissolved in 100 parts of methylene chloride-methanol (9:1) and 10 parts of trans-diacetoxy stearic acid methyl ester. The solution may be cast to a flexible film (44μ) which has a resistance to tearing of 2.9 kg. per sq. m. m., 21.3% of extensibility, the bending strength of 281 and the resistance to cold of −70°. The solution is suitable for producing protecting coatings on wood, metal, glass or fabrics.

*Example 19*

4 parts of cellulose acetate and 4 parts of cis-diacetoxy stearic acid butyl ester are dissolved in 50 parts of methylene chloride-methanol (9:1) and then the solution is cast to foils. These have (at 61μ) a resistance to tearing of 3.4 kg. per sq. m. m., 14.5% extensibility, the bending strength of 1900–3000 and the resistance to cold of −80°. The solution is suitable for covering flexible electric conducting wires and cables which are flexible in the cold.

Beside the excellent resistances to cold named above, the high polymeric masses to which the softeners according to the invention are added have also a very satisfactory resistance to heat. According to the usual stability test—consisting in heating the mass of artificial material in the nitrogen flow at 170° and in determining the time passed until the first splitting off of hydrogen chloride is identified by a solution of silver nitrate—the masses of artificial material described in the Examples 9 to 19 have resistances to heat of about 2½ hours and more.

The invention claimed is:

1. The method of plasticizing and thermally stabilizing polyvinyl chloride which comprises incorporating therein an aliphatic ester of diacetoxy stearic acid.

2. The method of plasticizing and thermally stabilizing polyvinyl chloride which comprises incorporating therein an aliphatic ester of diacetoxy stearic acid and an aliphatic ester of acetoxy chloro stearic acid.

3. The method of plasticizing and thermally stabilizing polyvinyl chloride which comprises incorporating therein an aliphatic ester of diacetoxy stearic acid and an aliphatic ester of chlorinated tall oil fatty acid.

4. The method of plasticizing and thermally stabilizing polyvinyl chloride which comprises incorporating therein an aliphatic ester of diacetoxy stearic acid and an aliphatic ester of tall oil fatty acid.

5. A plastic composition comprising polyvinyl chloride and, as a plasticizer and thermal stabilizer therefor, an aliphatic ester of diacetoxy stearic acid.

6. A plastic composition comprising polyvinyl chloride and, as a plasticizer and thermal stabilizer therefor, an aliphatic ester of diacetoxy stearic acid and an aliphatic ester of acetoxy chloro stearic acid.

7. A plastic composition comprising polyvinyl chloride and, as a plasticizer and thermal stabilizer therefor, an aliphatic ester of diacetoxy stearic acid and an aliphatic ester of chlorinated tall oil fatty acid.

8. A plastic composition comprising polyvinyl chloride and, as a plasticizer and thermal stabilizer therefor, an aliphatic ester of diacetoxy stearic acid and an aliphatic ester of tall oil fatty acid.

WOLFGANG GRUBER.
HANS MACHEMER.